United States Patent [19]

Torisawa et al.

[11] Patent Number: 4,922,285
[45] Date of Patent: May 1, 1990

[54] METHOD OF AND APPARATUS FOR PHOTOGRAPHING AN IMAGE

[75] Inventors: Nobuyuki Torisawa; Hirokazu Okutsu; Katsuhiro Aoki, all of Minamiashigara, Japan

[73] Assignee: Fuji Photo Film Co., Ltd., Kanagawa, Japan

[21] Appl. No.: 230,806

[22] Filed: Aug. 10, 1988

[30] Foreign Application Priority Data

Aug. 11, 1987 [JP] Japan .................. 62-201197
Oct. 19, 1987 [JP] Japan .................. 62-264288
Nov. 6, 1987 [JP] Japan .................. 62-281863

[51] Int. Cl.$^5$ ............................. G03B 27/72
[52] U.S. Cl. .................... 355/20; 355/46; 355/54; 354/76
[58] Field of Search .......... 355/46, 53, 54, 20; 354/76; 346/110 R

[56] References Cited

U.S. PATENT DOCUMENTS 4,573,780 3/1986 Sato et al. .................. 354/76
4,664,506 5/1987 Seki et al. .................. 355/20
4,695,142 9/1987 Holt .................. 354/76 X

FOREIGN PATENT DOCUMENTS 60-66242 4/1985 Japan .

Primary Examiner—L. T. Hix
Assistant Examiner—D. Rutledge
Attorney, Agent, or Firm—Sughrue, Mion, Zinn, Macpeak & Seas

[57] ABSTRACT

Images projected by an image-focusing optical mechanism including a display unit such as a CRT display are photographed on a photosensitive medium such as a photographic film. First, the optical mechanism is positioned in a reference position. Then, the optical mechanism is displaced by successive intervals while photographing the images successively on the photosensitive medium at respective areas thereon with the optical mechanism. After all of the images have been photographed, the optical mechanism is positioned in the reference position again in preparation for photographing images on a next photosensitive medium.

9 Claims, 10 Drawing Sheets

METHOD OF AND APPARATUS FOR PHOTOGRAPHING AN IMAGE

BACKGROUND OF THE INVENTION

The present invention relates to a method and an apparatus for photographing an image, and more particularly to a method of and an apparatus for photographing an image displayed on a CRT monitor on a photosensitive medium such as a photographic film by positioning the photosensitive medium, then feeding the photosensitive medium by a certain amount, positioning the CRT monitor in a reference position with respect to each photosensitive medium, and thereafter displacing the CRT monitor in a direction substantially at a right angle to the direction in which the photosensitive medium is fed, while photographing the CRT monitor image on the photosensitive medium, so that the position where images start to be photographed on a plurality of photosensitive mediums is kept constant at all times for increased image quality, and the position for starting to photograph images is stabilized for photographing images accurately.

There have widely been used in recent years image processing systems in which image information created by computerized tomograpy (CT) is displayed on a CRT monitor and photographed on a photographic photosensitive medium by an image photographing apparatus. The image processing system includes the image photographing apparatus, an image input unit such as a medical diagnostic unit, an image information processing unit for processing image information from the image input unit to produce an image to be displayed on the CRT monitor, and an automatic image developing unit for developing photographed images on the photosensitive medium.

In the image photographing apparatus, the photosensitive medium such as a photographic film supplied from a supply magazine is exposed to a plurality of images displayed on the CRT monitor. Various such image photographing apparatus have been proposed thus far. One of the proposed apparatus is disclosed in Japanese Laid-Open Patent Publication No. 61-284749, for example. In the disclosed image photographing apparatus, a photographic film supplied from a supply magazine is fed to an image focusing station by a feed mechanism, and then fixed in position in the image focusing station by a film presser plate which can be displaced perpendicularly toward and away from the film.

Image information displayed on the CRT monitor is imaged or photographed on the film in a certain area thereon by an image-focusing optical mechanism that comprises an image-focusing lens and a light source, or the CRT monitor, which carries the image information. A plurality of different pieces of image information are successively formed on the single photographic film. The image focusing optical mechanism is displaceable two-dimensionally along two axes in order to photograph the images on the film at various locations thereon.

The film on which the pieces of image information have been photographed is then released from the film presser plate by lowering the film presser plate away from the film, and is thereafter delivered by the feed mechanism. The film is fed into a receiver magazine disposed substantially horizontally below the supply magazine, and the receiver magazine is supplied to the automatic image developing unit. The film may directly be fed to the automatic image developing unit.

The image-forming or focusing optical mechanism in the image photographing apparatus can be moved a prescribed interval by a stepping motor or the like and stopped in alignment with an area on the film where an image is to be photographed. The image-focusing optical mechanism is positioned in a reference position only when the image photographing apparatus is energized, and then moved from the reference position in increments by the stepping motor for photographing the images on the film in successive positions thereon. If an error is produced when positioning the optical mechanism in the reference position, or if the optical mechanism is stopped in a misaligned position due for example to erroneous operation of the stepping motor, images will be photographed on all subsequent films in different positions thereon. When this trouble occurs, the images are photographed in improperly displaced positions on the films, and sometimes the images of these films may not be used.

The image photographing apparatus should be equipped with a driver mechanism for angularly moving the film-positioning film presser plate toward and away from the film. Since a plurality of pieces of desired image information are photographed on a single film, the image-focusing optical mechanism is displaceable along two axes, as described above. To effect such two-dimensional displacement of the optical mechanism, the image photographing apparatus is also required to have driver mechanisms for moving the optical mechanism along the respective axes and means for stopping the optical mechanism accurately along the respective axes. Consequently, the image photographing apparatus is considerably complex in structure, large in size, and highly costly to manufacture.

There have been devised various apparatus in which a CRT monitor is movable along one axis and images of different sizes can be photographed. Such apparatus are disclosed in Japanese Laid-Open Patent Publications Nos. 55-60937 and 55-60971, for example. Each of the disclosed apparatus includes a plurality of first image-forming focusing lenses for forming images of smaller sizes and a plurality of second image forming focusing lenses for forming images of larger sizes, the first and second focusing lenses being disposed above a CRT monitor which can be moved in a direction substantially at a right angle to the direction in which photographic films are fed. The first and second focusing lenses are arrayed in the direction of movement of the CRT monitor. The CRT monitor has an optical axis positioned intermediate between the first and second lenses. Therefore, when the first and second focusing lenses are used to photograph displayed images on the CRT monitor, light from the CRT monitor reaches the film at different position along the film feeding direction. Consequently, dependent on whether the first focusing lenses or the second focusing lenses are used, it is necessary to stop the film in a different position where an image is formed, and hence the apparatus is required to have positioning control means or the like for positioning the film.

Moreover, as described above, the plural first and second focusing lenses have to be provided. Therefore, a light-shielding member is needed to prevent light from the CRT monitor from passing through those focusing lenses which are not in use. As a result, the apparatus is quite complex in structure, and the cost of manufacture of the apparatus is high.

SUMMARY OF THE INVENTION

It is a major object of the present invention to provide a method of and an apparatus for photographing an image on a photosensitive medium with a image-focusing optical mechanism having a CRT monitor which displays the image, by positioning the photosensitive medium with a pair of rollers and a guide plate, then displacing the photosensitive medium in one direction, positioning the image-focusing optical mechanism in a reference position, thereafter moving the optical mechanism a prescribed distance from the reference position, and photographing the image on the photosensitive medium in a prescribed area thereon, so that the image photographing apparatus is smaller in size and simpler in structure without requiring any film presser plate, the position where images are photographed on respective photosensitive mediums is stabilized at all times, and images of different sizes can easily be photographed solely with the image photographing apparatus without making complex the image photographing apparatus in which the image-focusing optical mechanism is incorporated.

Another object of the present invention to provide a method of photographing images projected by an imagefocusing optical mechanism including a display unit on a photosensitive medium, comprising the steps of positioning the optical mechanism in a reference position, then displacing the optical mechanism by successive intervals while photographing the images successively on the photosensitive medium at respective areas thereon with the optical mechanism, and positioning the optical mechanism in the reference position again in preparation for photographing images on a next photosensitive medium.

Still another object of the present invention to provide a method of photographing images projected by an image-focusing optical mechanism including a display unit on a photosensitive medium, wherein after the photosensitive medium is positioned, the optical mechanism is displaced by the successive intervals to photograph the images on the photosensitive medium, and then the photosensitive medium is displaced in a direction substantially at a right angle to the direction in which the optical mechanism has been displaced, after which images are photographed by the optical mechanism on the photosensitive medium at respective areas thereon for thereby photographing images in a plurality of frames on the photosensitive medium.

Yet another object of the present invention to provide a method of photographing images projected by an image-focusing optical mechanism including a display unit on a photosensitive medium, wherein arrival of the optical mechanism at the reference position when the optical mechanism is displaced to the reference position is detected by a position sensor.

Yet still another object of the present invention to provide a method of photographing images projected by an image-focusing optical mechanism including a display unit on a photosensitive medium, wherein the position sensor comprises a photosensor including a light-emitting element and a light detector, and the optical mechanism has a member for actuating the photosensor to detect the arrival of the optical mechanism at the reference position.

A further object of the present invention is to provide an apparatus for photographing images displayed on a display unit on a photosensitive medium, comprising a first feed mechanism for feeding the photosensitive medium to a prescribed position, an image-focusing optical mechanism for photographing the images on the photosensitive medium fed by the first feed mechanism, an image positioning mechanism for positioning the photosensitive medium and delivering the photosensitive medium by prescribed intervals while the images are successively photographed on the photosensitive medium by the optical mechanism, the image positioning mechanism comprising a constant feed roller pair and a pair of guide members, the constant feed roller pair being disposed in confronting relation &o the first feed mechanism, one of the guide members facing the optical mechanism and having an opening defined therein for passage therethrough of light from the displayed images, the image positioning mechanism being arranged to deliver the photosensitive medium back toward the first feed mechanism while holding one end of the photosensitive medium with the constant feed roller pair to allow the optical mechanism to photograph the images on the photosensitive medium in at least two frames thereon, and a second feed mechanism for feeding the photosensitive medium after the images have been photographed thereon.

A still further object of the present invention is to provide an apparatus for photographing images displayed by a display unit on a photosensitive medium, wherein the first feed mechanism comprises a pair of rollers and a first guide member which is angularly movable to feed the photosensitive medium selectively to the image positioning mechanism and the second feed mechanism.

A yet further object of the present invention is to provide an apparatus for photographing images displayed by a display unit on a photosensitive medium, wherein the first feed mechanism fur&her comprises a second guide member disposed above the first guide member and slanted for guiding a leading end of the photosensitive medium toward the constant feed roller pair.

A yet still further object of the present invention is to provide an apparatus for photographing images displayed by a display unit on a photosensitive medium, wherein the image focusing mechanism includes a stepping motor directly coupled to the constant feed roller pair for rotating the same.

Another object of the present invention is to provide an apparatus for photographing images displayed by a display unit on a photosensitive medium, wherein the guide members of the image positioning mechanism are spaced from each other by a gap which is greater than the thickness of the photosensitive medium and smaller than the depth of field of a focusing lens of the optical mechanism.

Still another object of the present invention is to provide an apparatus for photographing images displayed by a display unit on a photosensitive medium, wherein the optical mechanism includes the display unit and a focusing lens, and is displaceable in a direction substantially normal to the direction in which the photosensitive medium is delivered in the image positioning mechanism.

Yet another object of the present invention is to provide an apparatus for photographing images displayed by a display unit on a photosensitive medium, fur!her including a single drive source for actuating the first and second feed mechanisms.

Yet still another object of the present invention is to provide an apparatus for photographing images displayed by a display unit on a photosensitive medium, further including a support member supporting the first feed mechanism, the image positioning mechanism, and the second feed mechanism.

A further object of the present invention is to provide an apparatus for photographing images displayed by a display unit on a photosensitive medium, further including a housing in which the first feed mechanism, the optical mechanism, the image positioning mechanism, and the second feed mechanism are accommodated, and a cable extending out of the housing for supplying an image signal to the optical mechanism, the housing including light-shielding means disposed around the cable for preventing extraneous light from entering the housing.

It is also an object of the present invention to provide an apparatus for photographing images on a photosensitive medium, comprising an image-focusing optical mechanism including a display unit for displaying the images to be photographed on the photosensitive medium, and a plurality of focusing lenses for forming images of the displayed images at respective magnifications on the photosensitive medium, one of the focusing lenses which is more frequently used than the other being positionable in alignment with an optical axis of the display unit, the other focusing lens being positionable off the optical axis of the display unit, the focusing lenses being selectively used for photographing the images at their respective magnifications on the photosensitive medium.

Another object of the present invention is to provide an apparatus for photographing images displayed by a display unit on a photosensitive medium, wherein the optical mechanism further includes an angularly movable support shaft and a plurality of holder arms mounted on the support shaft and angularly spaced from each other, the focusing lenses being mounted on the holder arms, respectively, the support shaft being angularly movable about an axis thereof for selectively placing the focusing lenses in facing relation to the display unit.

Still another object of the present invention is to provide an apparatus for photographing images displayed by a display unit on a photosensitive medium, wherein the focusing lenses are disposed to photograph the images on the photosensitive medium in respective areas thereon which have respective edges lying in substantially the same position.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
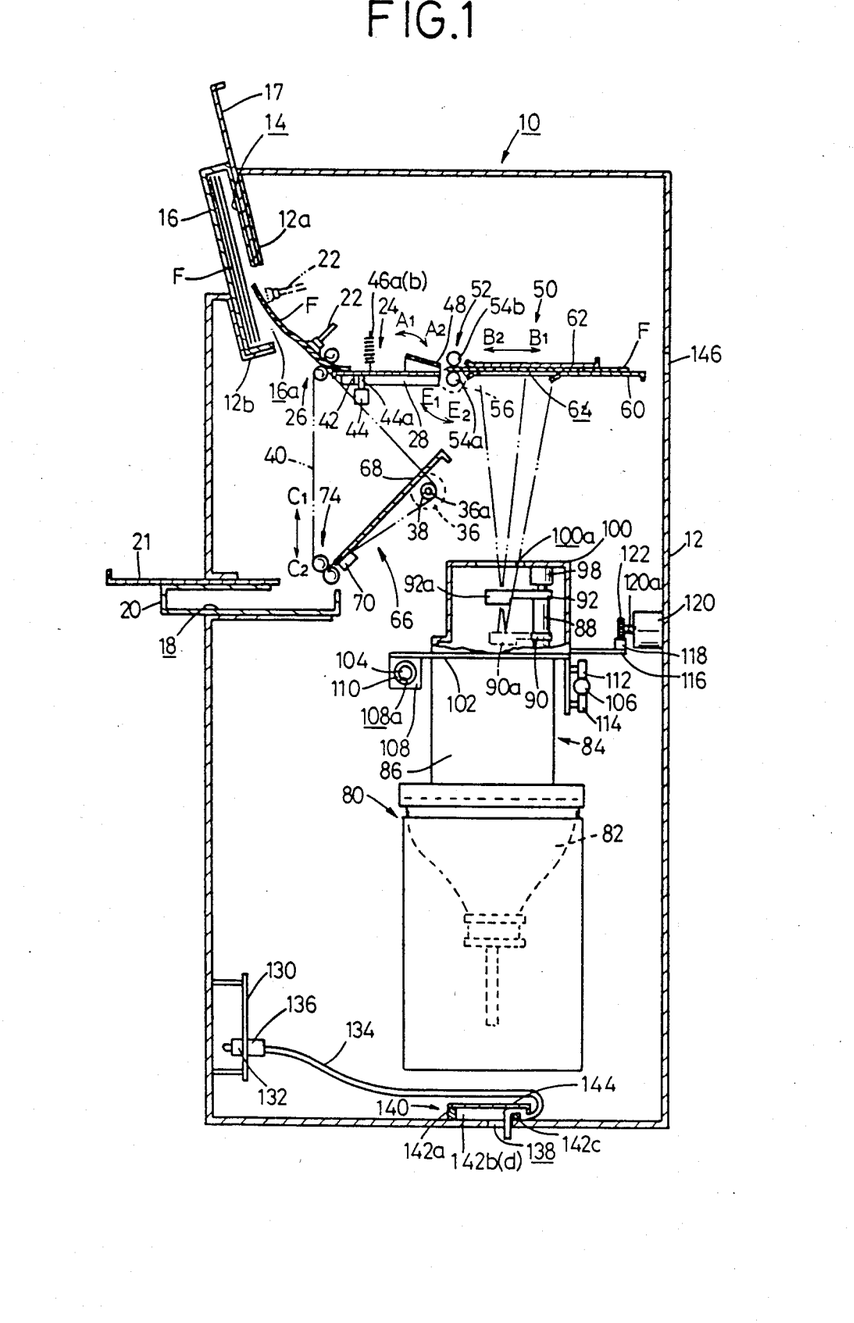
FIG. 1 is a schematic vertical cross-sectional view of an image photographing apparatus for carrying out an image photographing method according to the present invention.

FIG. 1 shows an image photographing apparatus, generally designated by the reference numeral 10, for carrying out an image photographing method according to the present invention. The image photographing apparatus 10 includes a housing 12 having a slot 14 defined in an upper corner by a slanted plate 12a and a bent plate 12b for receiving a supply magazine 16 in a light-shielding manner. More specifically, the supply magazine 16 is inserted into the slot 14 until the leading end of the supply magazine 16 reaches the bent end of the bent plate 12b whereupon the supply magazine 16 is fully loaded in the slot 14 while shielding the slot 14 against entry of any extraneous light. The supply magazine 16 contains a stack of photographic films F and has an opening 16a which is openably closed by a shutter 17.

The housing 12 also has a slot 18 defined substantially centrally in a side wall thereof. A receiver magazine 20 can be mounted in the slot 18 in a light-shielding fashion, the receiver magazine 20 having a shutter 21 for closing its opening.

A sheet delivery mechanism including a suction cup 22 is disposed in the housing 12 near the film access opening 16a of the supply magazine 16. The suction cup 22 can be moved along a predetermined path toward a first feed mechanism 24 by an actuator means (not shown).

Figure 2:
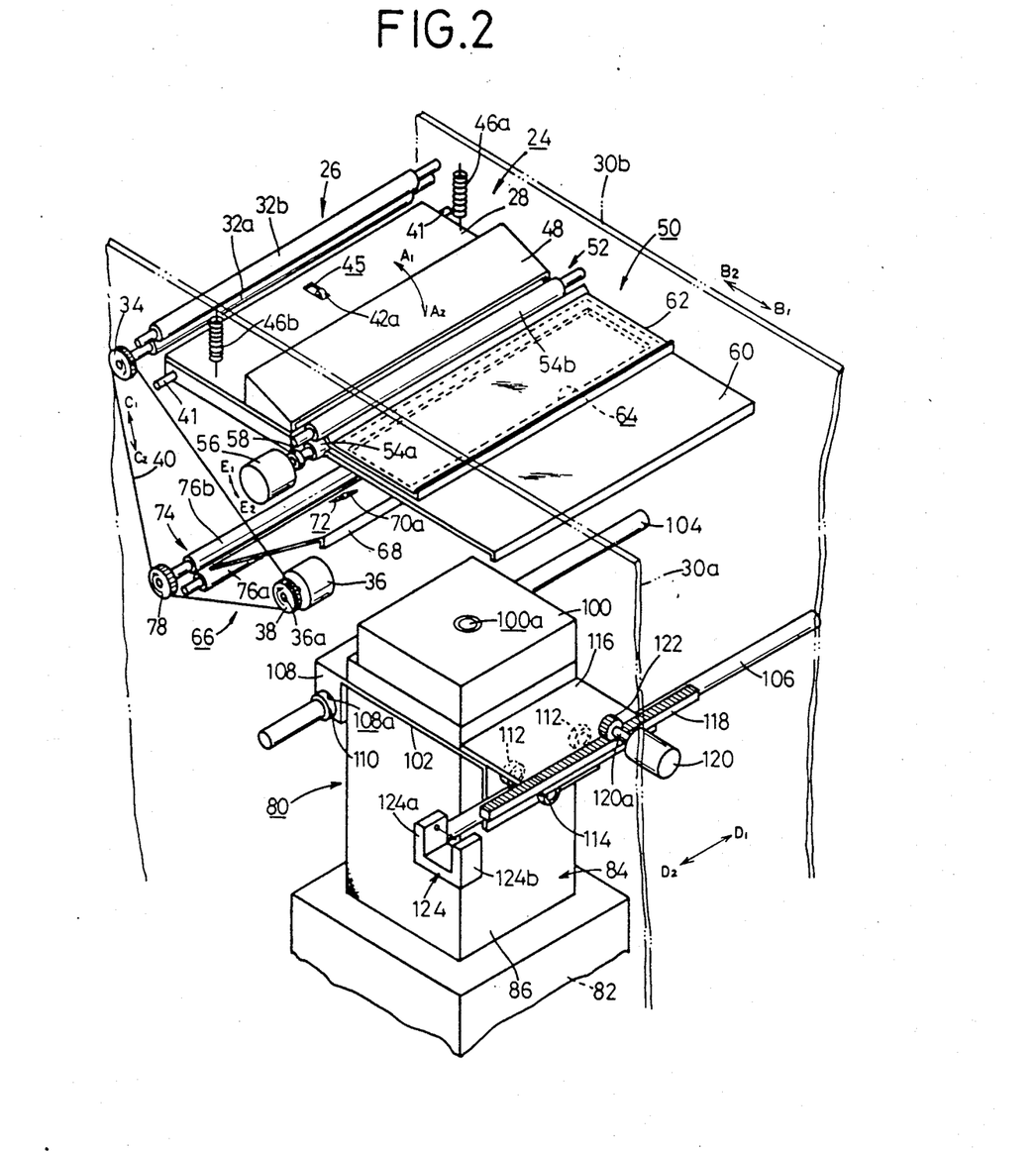
FIG. 2 is a perspective view of components of the image photographing apparatus shown in FIG. 1.

As shown in FIGS. 1 and 2, the first feed mechanism 24 includes a pair roller pair 26 and a guide plate 28, the first roller pair 26 comprising a pair of rollers 32a, 32b rotatably supported on and extending between a pair of laterally spaced vertical side plates 30a, 30b. The roller 32a has an end extending through the side plate 30a and supporting a sprocket 34 (see FIG. 2). A chain 40 is trained around the sprocket 34, a sprocket 38 mounted on the drive shaft 36a of a motor 36 supported on the side plate 30a, and a sprocket 78 mounted on an end of one of rollers of a second roller pair (described later). The sprocket 34 incorporates therein a one-way clutch which allows the sprocket 34 only to be idly rotated when the chain 40 runs in the direction of the arrow $C_2$.

The guide plate 28 is angularly movably supported on the side plates 30a, 30b by pins 41 attached thereto at an end near the first roller pair 26. A limit switch 44 is mounted on the lower surface of the guide plate 28, which engages a rod 44a of a solenoid 44 (see FIG. 1). As illustrated in FIG. 2, the limit switch 42 has a detector leaf 42a projecting upwardly slightly above the upper surface of the guide plate 28 through a hole 45 defined centrally in the guide plate 28. The limit switch 42 can thus detect a photographic film F placed on the guide plate 28 upon depression by the film F of the detector leaf 42a.

The guide plate 28 is normally urged to move upwardly by a pair of tension springs 46a, 46b connected to the guide plate 28. Therefore, the guide plate 28 is angularly movable about the pins 41 in the direction of the arrow $A_1$ under the bias of the tension springs 46a, 46b, and is also angularly movable about the pins 41 in the direction of the arrow $A_2$ by the rod 44a in response to energization of the solenoid 44. Another guide plate 48 is disposed on the guide plate 28 at its opposite end, the guide plate 48 having a large opening in its upstream end (lefthand end in FIG. 1) and slanting from the large opening toward the downstream end. The guide plate 48 thus guides the film F therethrough from the opening thereof.

An image positioning mechanism 50 is disposed in the vicinity of the first feed mechanism 24. The image positioning mechanism 50 includes a constant feed roller pair 52 for feeding the film F in the direction of the arrow $B_1$ and also for feeding the film F a prescribed interval at a time in the direction of the arrow $B_2$. The constant feed roller pair 52 comprises a pair of rollers 54a, 54b rotatably supported on and extending between the side plates 30a, 30b. The roller 54a has an end directly coupled by a coupling 58 to the drive shaft 56a of a first stepping motor 56 mounted on the side plate 30a. Guide plates 60, 62 are disposed adjacent to the constant feed roller pair 52 with their ends confronting the rollers 54a, 54b. The guide plates 60, 62 are vertically spaced from each other by a distance that is slightly larger than the thickness of the film F and smaller than the depth of field of image-forming focusing lenses (described later on). Therefore, even if the film F is fed into the gap between the guide plates 60, 62 while the film F is being flexed, the film F is corrected out of the flexed condition and hence kept flatwise by the guide plates 60, 62 so that desired image information will not be defocused on the film F. The guide plate 60, positioned below the guide plates 62, has a rectangular opening 64 defined therein near the constant feed roller pair 52 and extending transversely of the guide plate 60 between the side plates 30a, 30b. The film F sandwiched between the guide plates 60, 62 can be exposed to light applied from below the guide plate 60 through the opening 64.

The film F on which a desired image is photographed while the film F is being positioned by the image positioning mechanism 50 is then fed toward a second feed mechanism 66. The second feed mechanism 66 includes a slanted guide plate 68 for holding the film F sent from the image positioning mechanism 50 and for guiding the film F in a predetermined direction. As shown in FIG. 1, a limit switch 70 is attached to the lower surface of the guide plate 68. As shown in FIG. 2, the limit switch 70 has a detector leaf 70a projecting upwardly slightly above the upper surface of the guide plate 68 through a hole 72 defined centrally in the guide plate 68. The limit switch 70 can thus detect a photographic film F placed on the guide plate 68 upon depression by the film F of the detector leaf 70a.

A second roller pair 74 is positioned in slightly spaced relation to the second feed mechanism 66 and above the receiver magazine 20. The second roller pair 74 comprises a pair of rollers 76a, 76b rotatably supported on and extending between the side plates 30a, 30b. The roller 76b has an end extending through the side plate 30a and on which the sprocket 78 (described above) is mounted. As described above, the chain 40 trained around the sprockets 34, 38 is also trained around the sprocket 78. The sprocket 78 incorporates therein a one-way clutch for allowing the sprocket 78 only to be idly rotated, without rotating the second roller pair 74, when the chain 40 runs in the direction of the arrow $C$,. Therefore, when the chain 40 is driven to run in the direction of the arrow C, by the motor 36, the sprockets 78 and the roller 76b are rotated about their own axes to feed the film F from the second feed mechanism 66 into the receiver magazine 20. The one-way clutches in the sprockets 34, 78 serve to level the difference between the speeds of feed of the film F in the first feed mechanism 26 and the image positioning mechanism 50.

As shown in FIGS. 1 and 2, an image-focusing optical mechanism 80 is located below the image positioning mechanism 50. The optical mechanism 80 includes a CRT monitor 82 for displaying a desired image, and a lens holder 84 disposed upwardly of the CRT monitor 82 and holding focusing lenses (described later). The lens holder 84 includes a casing 86 having an upper panel on which a vertical support shaft 88 is rotatably supported at one end of the upper panel.

Figure 3:
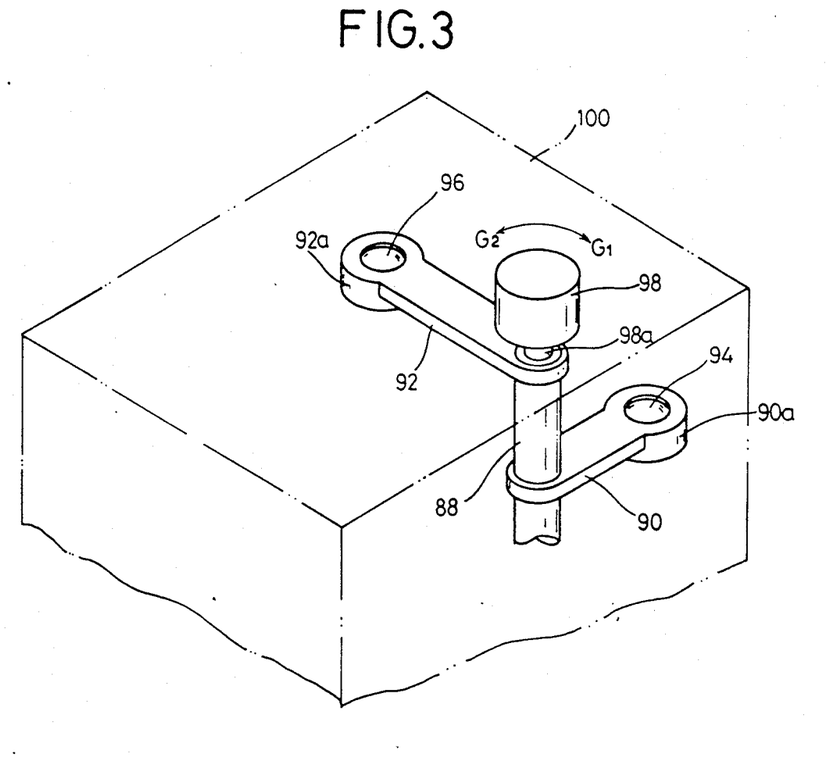
FIG. 3 is a fragmentary perspective view of an image-focusing optical mechanism in the image photographing apparatus.

As illustrated in FIG. 3, the support shaft 88 supports a first holder arm 90 and a second holder arm 92 longer than and above the first holder arm 90, the first and second holder arms 90, 92 extending horizontally and being spaced vertically from each other. The first and second holder arms 90, 92 are angularly spaced about 90° from each other, and have substantially cylindrical lens mounts 90a, 92a, respectively, on their distal ends, with first and second focusing lenses 94, 96 mounted respectively in the lens mounts 90a, 92a. Accordingly, the distance between the first focusing lens 94 and the CRT monitor 82 is smaller than the distance between the second focusing lens 96 and the CRT monitor 82, so that an image displayed by the CRT monitor 82 can be formed on the film F by the first focusing lens 94 at a greater magnification than by the second focusing lens 96.

The support shaft 88 has an upper end coupled to a rotative drive source 98 fixedly mounted on a cover member 100 enclosing the support shaft 88 and the first and second holder arms 90, 92. The support shaft 88 can be rotated about its own axis selectively in the directions of the arrow $G_1$ and $G_2$ by the rotative drive source 98. When the support shaft 88 is rotated in the direction of the arrow $G_1$, the second focusing lens 96 supported on the second holder arm 92 is positioned in substantial alignment with the optical axis of the CRT monitor 82 for image focusing. When the support shaft 88 is rotated in the direction of the arrow $G_2$, the first focusing lens 94 supported on the first holder arm 90 is positioned in a position that is slightly displaced off the optical axis of the CRT monitor B2 toward the support shaft 88, for image focusing. However, it is to be assumed here that the second focusing lens 96 which is positionable in alignment with the optical axis of the CRT monitor 82 is used more frequently than the first focusing lens 94.

The cover member 100 has a circular opening 100a defined in its upper panel. Light emitted from the CRT monitor 82 and passing through a selected one of the first and second focusing lenses 94, 96 goes through the opening 100a toward the film F which has been delivered in the image positioning mechanism 50.

The lens holder 84 is supported on two spaced guide rods 104, 106 (FIG. 2) through an attachment plate 102, the guide rods 104, 106 extending parallel to each other between and being supported on the side plates 30a, 30b. A guide 108 is disposed on one end of the attachment plate 102 and has a hole 108a defined therethrough. A cylindrical sleeve 110 is fitted in the hole 108a and slidably over the guide rod 104. The other end of the attachment plate 102 is bent downwardly substantially at a right angle. The downwardly bent end of the attachment plate 102 supports thereon guide rollers 112 positioned over the guide rod 106 and rollingly riding on the guide rod 106, and a guide roller 104 held in rolling engagement with the lower surface of the guide rod 106.

A rack 118 is attached to the attachment plate 102 above the downwardly bent end thereof, the rack 118 extending in the same direction as and substantially parallel to the guide rods 104, 106. A second stepping motor 120 mounted on a side wall of the housing 12 (FIG. 1) opposite to the slot 18 has a drive shaft 120a on which there is mounted a pinion 122 held in mesh with the rack 118. A photosensor 124 is disposed near one end of the guide rod 106, the photosensor 124 comprising a light-emitting element 124a and a light detector 124b (see FIG. 2).

When the pinion 122 is rotated by the second stepping motor 120, the optical mechanism 80 is displaced along the guide rods 104, 106 in the direction of the arrow $D_1$ or $D_2$ through the rack 118 for photographing images on the film F at a plurality of areas (frames) thereon. Upon the rack 118 entering as a detected member between the light-emitting element 124a and the light detector 124b, arrival of the optical mechanism 80 at a reference position is detected, thus positioning and stopping the optical mechanism 80.

As shown in FIG. 1, a connector 132 is mounted on a lower portion of the side wall of the housing 12 below the slot 18 through an attachment 130. The connector 132 is connected to another connector 136 attached to an end of a cable 134 for supplying a video signal to display an image on the CRT monitor 82. The cable 134 extends out of the housing 12 through an opening 138 defined in the bottom wall of the housing 12, and is connected to a medical image diagnostic system (not shown). A light-shielding means 140 is disposed near the opening 138 in covering relation to the opening 138. The light-shielding means 140 comprises light-shielding spongy members 142a through 142d mounted on the upper surface of the bottom wall of the housing 12 around the opening 138, and a plate 144 attached to the upper surfaces of the spongy members 142a, 142b, 142d. The plate 144 has an end portion bent downwardly on one side of the spongy member 142c. The cable 134 extends through the opening 138 into the light-shielding means 140, passes through a space between the spongy member 142c and the distal end of the bent end portion of the plate 144 while slightly pressing the spongy member 142c, and then extends between the plate 144 and the lower surface of the bottom wall of the housing 12 into the housing 12. The light-shielding spongy member 142c which is pressed by the cable 134 substantially surrounds a portion of the cable 134 and is held against the plate 144 in a light-shielding manner for preventing extraneous light from entering the housing 12 through the opening 138.

The side wall of the housing 12 on which the second stepping motor 120 is supported has a slot 146 defined therein for passage therethrough of the film F toward an automatic image developing apparatus (not shown) connected to the image photographing apparatus 10. If the image photographing apparatus 10 is used alone without such an automatic image developing apparatus, then the slot 146 is closed off by a light-shielding member (not shown).

Figure 4:
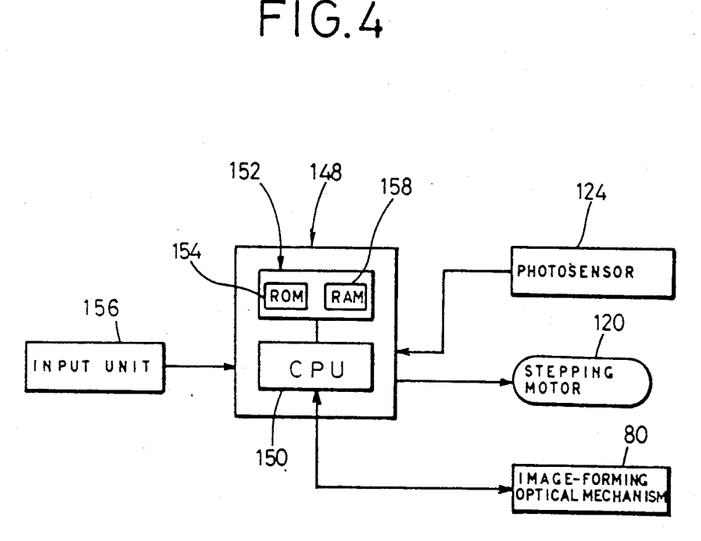
FIG. 4 is a block diagram of a control system for the image photographing apparatus.

A control system for controlling the image photographing apparatus 10 is illustrated in FIG. 4. The control system includes a controller 148 having a CPU (central processing unit) 150 and a memory unit 152. The memory unit 152 comprises a ROM 154 storing a number of pulses corresponding to the number of frames to be photographed and an operation program for controlling the image photographing apparatus 10, and a RAM 158 for storing the number of frames to be photographed which is entered by an input unit 156. The controller 148 is supplied with a detected signal from the photosensor 124, i.e., a signal indicating whether the optical mechanism 80 is in the reference position or not. The controller 148 supplies a number of pulses stored in the ROM 154 corresponding to the number of frames to be photographed which has been entered through the input unit 156, to the second stepping motor 120, and also applies a signal for starting a photographing process to the optical mechanism 80. As described above, the optical mechanism 80 is moved in a selected direction by the second stepping motor 120.

Operation and advantages of the image photographing apparatus 10 thus constructed will be described below.

The supply magazine 16 with a stack of photographic films F stored therein is loaded into the slot 14 in the light-shielding manner, and the receiver magazine 20 is also loaded into the slot 18 in the light-shielding fashion When the supply magazine 16 and the receiver magazine 20 are loaded, their shutters 17, 21 are operated to open the openings of these magazines.

The image photographing apparatus 10 is then energized to effect an image photographing process. The image photographing process will be described with reference to the flowchart of FIGS. 5a, 5b, and 5c.

Figure 5A:
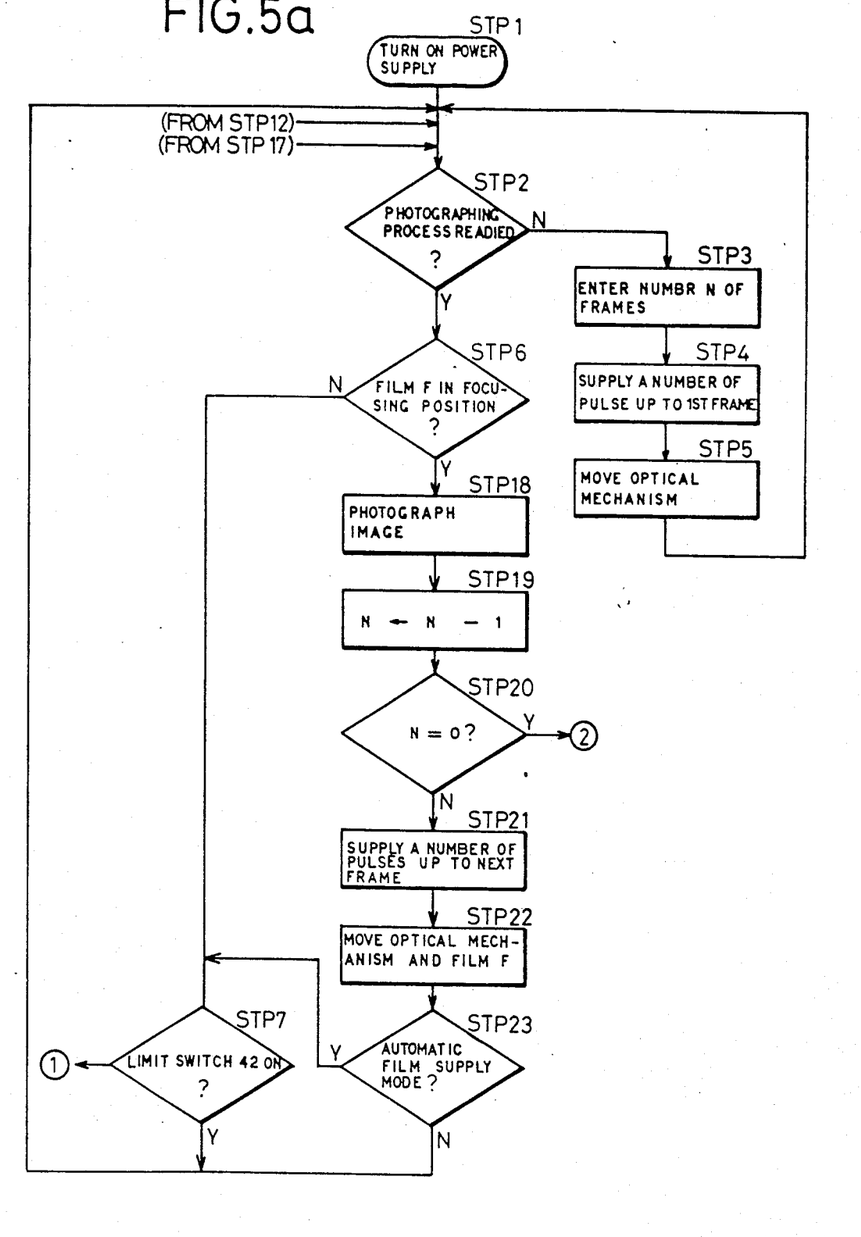
FIGS. 5a through 5c are a flowchart of operation of the image photographing apparatus.
Figure 5B:
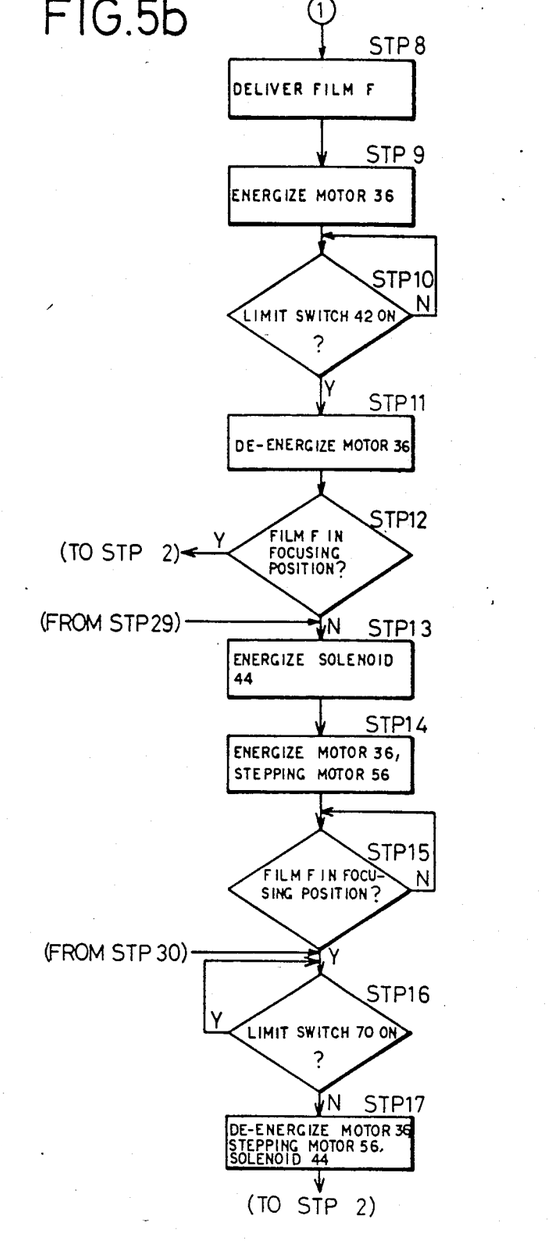
Figure 5C:
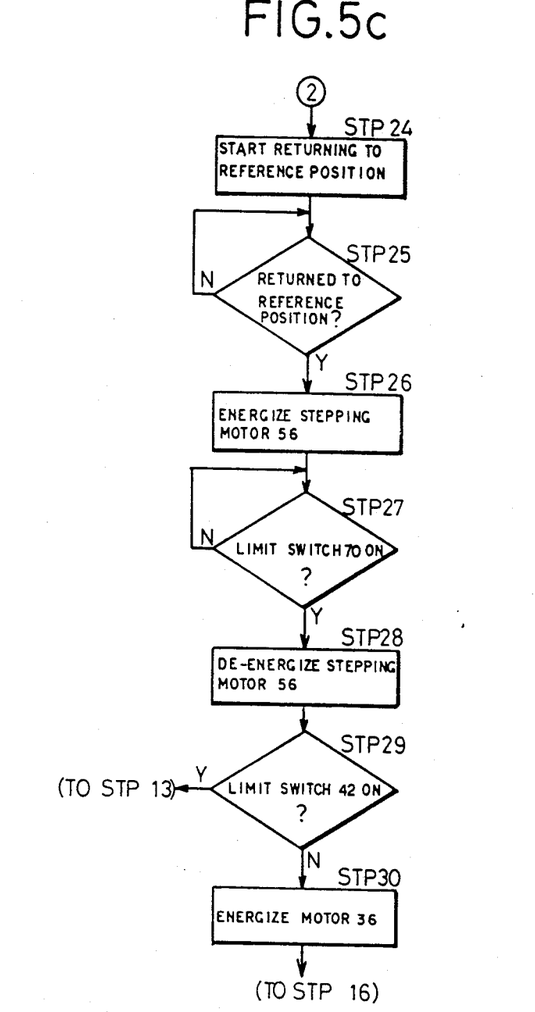

The power supply of the image photographing apparatus 10 is switched on in a step 1, and then the imagefocusing optical mechanism 80 is displaced into the reference position. More specifically, the second stepping motor 120 is energized to rotate the pinion 122 mounted on the drive shaft 120a for thereby displacing the rack 118 meshing with the pinion 122 and the optical mechanism 80 in unison in the direction of the arrow $D_2$. The rack 118 is moved until its end is positioned between the light-emitting element 124a and the light detector 124b of the photosensor 124, whereupon arrival of the optical mechanism 80 at the reference position is detected.

Then, a step 2 determines whether the optical mechanism 80 has been readied for a photographing cycle, i.e., whether the optical mechanism 80 has reached a photographing cycle starting position. At this time, however, the optical mechanism 80 is in the reference position. A desired image is displayed on the CRT monitor 82 of the optical mechanism 80, and the number N of frames to be photographed on one photographic film F is entered into the RAM 158 of the controller 148 through the input unit 156 in a step 3. As a result, the CPU 150 fetches a signal indicative of a number of pulses up to the first frame, which corresponds to the number N of frames to be photographed, from the ROM 154, and applies the signal to the second stepping motor 120 in a step 4. Then, the second stepping motor 120 is driven by the supplied number of pulses to move the optical mechanism 80 to a prescribed photographing cycle starting position in a step 5. At this time, the drive shaft 120a and the pinion 120 are reversed by the second stepping motor 120 to move the optical mechanism 80 in the direction of the arrow $D_1$ through the rack 118.

When the optical mechanism 80 has reached the photographing cycle starting position, a sensor (not shown) detects whether there is a film F between the guide plates 60, 62 of the image positioning mechanism 50 in a step 6. At this time, no film F is present in the focusing position in the mechanism 50. Therefore, a step 7 ascertains whether a film F is present in a standby position by checking if the limit switch 42 is turned on or not. Since the films F are all slacked in the supply magazine 16 and no film F is in the standby position, control goes to a step 8 (FIG. 5b) in which the uppermost one of the films F is taken out of the supply magazine 16 by the suction cup 22 and fed to the first roller pair 26 of the first feed mechanism 24.

Figure 6A:
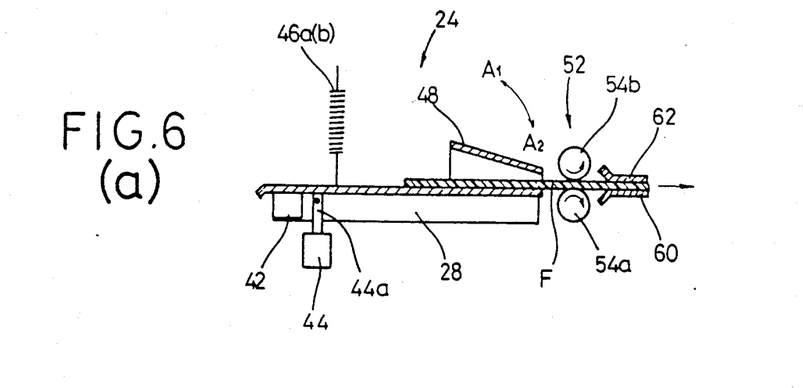
FIGS. 6(a) and 6(b) are cross-sectional views showing operation of a guide plate and a pair of rollers in the image photographing apparatus.

The motor 36 is energized to cause the sprocket 38 on the drive shaft 36a thereof to move the chain 40 in the direction of the arrow $C_1$ in a step 9. The film F is gripped by the rollers 32a, 32b of the first roller pair 26 and fed onto the guide plate 28, tripping the detector leaf 42a of the limit switch 42 to turn on the limit switch 42 in a step 10. The motor 36 is de-energized in a step 11, and it is determined again whether there is a film F between the guide plates 60, 62 in a step 12. No film F is as yet present in the focusing position, and hence the solenoid 44 is energized in a step 13. When the solenoid 44 is turned on, the rod 44a thereof is displaced downwardly, and the guide plate 28 engaging the rod 44a is turned in the direction of the arrow A, against the tension of the tension springs 46a, 46b (see FIG. 6(a)).

Then, the motor 36 is energized to rotate the first roller pair 26 in the directions of the arrows, and the first stepping motor 56 of the image positioning mechanism 50 is energized to rotate the constant feed roller pair 52 in the direction of the arrow $E_1$ in a step 14. The film F is now gripped by the constant feed roller pair 52 and fed thereby in the direction of the arrow B' until it is supplied between the guide plates 60, 62 of the image positioning mechanism 50. A step 15 now confirms that the film F is present between the guide plates 60, 62, followed by a step 16 determining whether here is a film F on the guide plate 687 of the second feed mechanism 66 by checking if the limit switch 70 is triggered. Inasmuch as no film F lies on the guide plate 68, the motor 36, the stepping motor 56, and the solenoid 44 are de-energized in a step 17. At this time, the trailing end of the film F remains gripped by the constant feed roller pair 52.

Figure 6B:
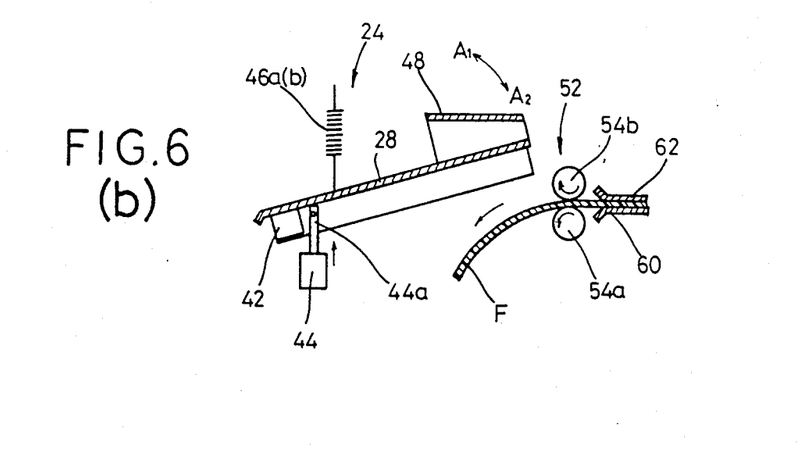

With the solenoid 44 de-energized, the guide plate 28 is angularly displaced in the direction of the arrow $A_1$ under the bias of the tension springs 46a, 46b (see FIG. 6(b)).

Control then goes from the step 2 to the step 6 again. Since the film F is in the image positioning mechanism 50, control proceeds from the step 6 to a step 18 for photographing the image on the film F in the image positioning mechanism 50.

As described above, the optical mechanism 80 is already in the photographing cycle starting position, and the image displayed by the CRT monitor 82 is photographed in the first frame on the film F through the second focusing lens 96 and the opening 100a in the step 18.

After the first frame is photographed, the number N of frames to be photographed, which is stored in the RAM 158, is decremented by "1", and the result is stored as N in the RAM 158 in a step 19. A step 20 then determines whether all frames have been photographed or not by ascertaining whether N is "0" or not. Since the image is photographed in only one frame on the film F, at this time, the CPU 150 reads a signal representing a number of pulses up to the next frame from the ROM 154, and supplies the signal to the second stepping motor 120 in a step 21.

The first stepping motor 56 directly coupled to the constant feed roller pair 52 is reversed to rotate in the direction of the arrow E, to displace the film F for a prescribed interval, and/or the optical mechanism 80 is displaced to move the next frame on the film F into the focusing position in a step 22. Because the first stepping motor 56 is directly coupled to the roller 54a of the constant feed roller pair 52, the film F can accurately be fed the prescribed interval without an error due for example to backlash. Since the guide plate 28 of the first feed mechanism 24 has been angularly displaced in the direction of the arrow $A_1$, the portion of the film F where the image has been photographed depends from the constant feed roller pair 52 (see FIG. 6(b)).

Then, a step 23 determines whether films F are supplied in an automatic supply mode. It is assumed here that films F are supplied in the automatic mode. Therefore, the processing from the step 7 to the step 12 is repeated to cause the first roller pair 26 of the first feed mechanism 24 to grip a new film F in a standby condition. Since the film F is present in the focusing position in the step 12, the processing in the steps 2, 6, 18 through 23 is executed again. When all images have been photographed on the film F in the image positioning mechanism 50 in the step 20, the optical mechanism 80 starts to be returned to the reference position in a step 21. More specifically, the second stepping motor 120 is energized to reverse the drive shaft 120a and the pinion 122. The optical mechanism 80 now starts to be displaced in the direction of the arrow $D_2$ through the rack 118 meshing with the pinion 122. Then, a step 25 determines whether the optical mechanism 80 has returned to the reference position or not by checking if the rack 118 enters between the light-emitting element 124a and the light detector 124b. Substantially concurrent with this, the first stepping motor 56 is energized to rotate the roller 54a of the constant feed roller pair 52 in the direction of the arrow $E_2$ in a step 26. The film F with all images photographed thereon is now fed in the direction of the arrow $B_2$ by the constant feed roller pair 52 and onto the guide plate 68 of the second feed mechanism 66. The detector leaf 70a of the limit switch 70 attached to the lower surface of the guide plate 68 is tripped by the film F to turn on the limit switch 70 in a step 27, which is followed by a step 28 in which the first stepping motor 56 is de-energized.

Then, a step 29 confirms that the next film F is gripped in the standby condition by the first roller pair 26 of the first feed mechanism 24, and the processing from the step 13 through the step 17 is repeated to deliver the new film F into the image positioning mechanism 50. The film F on the guide plate 68 is sent into the receiver magazine 20 by being gripped and fed by the second roller pair 74 of the second feed mechanism 66 in response to energization of the motor 36 in the step 14. More specifically, the motor 36 is energized to rotate the drive shaft 36a and the sprocket 38 in the direction of the arrow (FIG. 2) to cause the chain 40 to rotate the sprocket 78 and the roller 76b in the direction of the arrow. The film F is therefore delivered by the second roller pair 74 into the receiver magazine 20.

The above process is repeated until all desired image information is photographed on all films F stacked in and supplied from the supply magazine 16. When any film F is no longer detected in the step 29, the motor 36 is energized to feed the final film F from the guide plate 68 into the receiver magazine 20 in a step 30.

In the aforesaid embodiment, after all images have been photographed on the first film F, the optical mechanism 80 is once returned to the reference position. Therefore, even if the optical mechanism 80 is stopped in a displaced position due to an error when photographing an image on the film F and that image is formed in a misaligned position on the film F, since the optical mechanism 80 is moved back to the reference position for photographing images on a next film F, images can be photographed on the next film in prescribed locations or frames thereon with respect to the reference position. As a consequence, the image photographing cycle starting position remains the same for all films F, and images can be formed in aligned frames on the films.

The film F which is delivered to the image positioning mechanism 50 is positioned in place by the constant feed roller pair 52 and the guide plates 60, 62. The roller 54a of the constant feed roller pair 52 is directly coupled to the stepping motor 56 to stop the film F highly accurately without developing any feed error which would otherwise be caused by the constant feed roller pair 52. Therefore, the image photographing apparatus 10 incorporating the image positioning mechanism 50 is simplified in construction, and desired images can be photographed accurately on the film F.

The first roller pair 26 of the first feed mechanism 24 for feeding the film F to the image positioning mechanism 50, and the second roller pair 74 of the second feed mechanism 66 for feeding the photographed film F into the receiver magazine 20 are driven by the common single motor 36. This arrangement also serves to simplify the construction of the image photographing apparatus 10.

The feed system for feeding the film F and the optical mechanism 80 are supplied on the side plates 30a, 30b of the image photographing apparatus 10. Accordingly, the optical mechanism 80 and the image positioning mechanism 50 can relatively be positioned highly accurately when assembling the image photographing apparatus 10, and as a result the image photographing apparatus 10 can easily be assembled.

When desired images are photographed on all of the films F supplied from the supply magazine 20, the limit switch 42 of the first feed mechanism 24 is no longer triggered, indicating that no following film F is present in the first feed mechanism 24, so that the image photographing process is completed.

Figure 7:
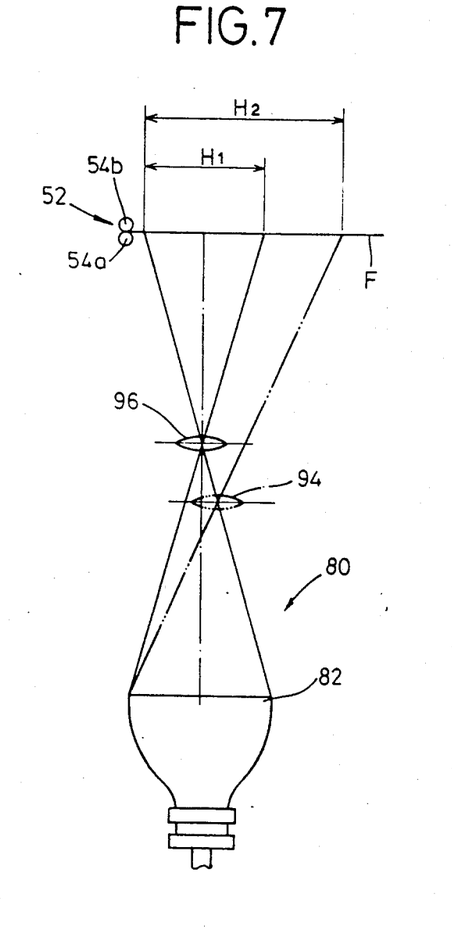
FIG. 7 is a schematic view showing the correlation between magnifications of the image-focusing optical mechanism and focusing lenses of the optical mechanism.

For photographing images of a relatively large size on a new film F, the first focusing lens 94 should be used in place of the second focusing lens 96. More specifically, the rotative drive source 98 of the optical mechanism 80 is energized to rotate the support shaft 88 in the direction of the arrow $G_2$ about its own axis. The first holder arm 90 mounted on the support shaft 88 is angularly moved to position the first focusing lens 94 in the lens mount 90a of the first holder arm 90 into confronting relation to the CRT monitor 82. Since the first holder arm 90 is slightly shorter than the second holder arm 92, the central optical axis of the first focusing lens 94 is slightly displaced off the optical axis of the CRT monitor 82. Therefore, light from the image displayed by the CRT monitor 82 is passed through the first focusing lens 94 to form an image on the film F in a range indicated by $H_2$.

The first focusing lens 94 is displaced off the optical axis of the CRT monitor 82 such that the range $H_2$ in which the light having passed through the first focusing lens 94 forms an image on the film F has an edge which is substantially in alignment with an edge of a range H' in which light coming from the second focusing lens 96 forms an image on the film F. Therefore, no light from the first focusing lens 94 reaches the constant feed roller pair 54 of the image positioning mechanism 52. Moreover, images of desired magnifications can be photographed solely in the image photographing apparatus 10 without stopping the film F in different positions corresponding to the magnifications and/or without displacing the CRT monitor 82 along two axes.

In the above embodiment, images are photographed at different magnifications on different films F. However, images may be photographed at different magnifications on a single film F.

An image photographing apparatus according to another embodiment will be described below with reference to FIG. 8. Those parts in this embodiment which are identical to those of the preceding embodiment are denoted by identical reference characters, and will not be described in detail.

Figure 8:
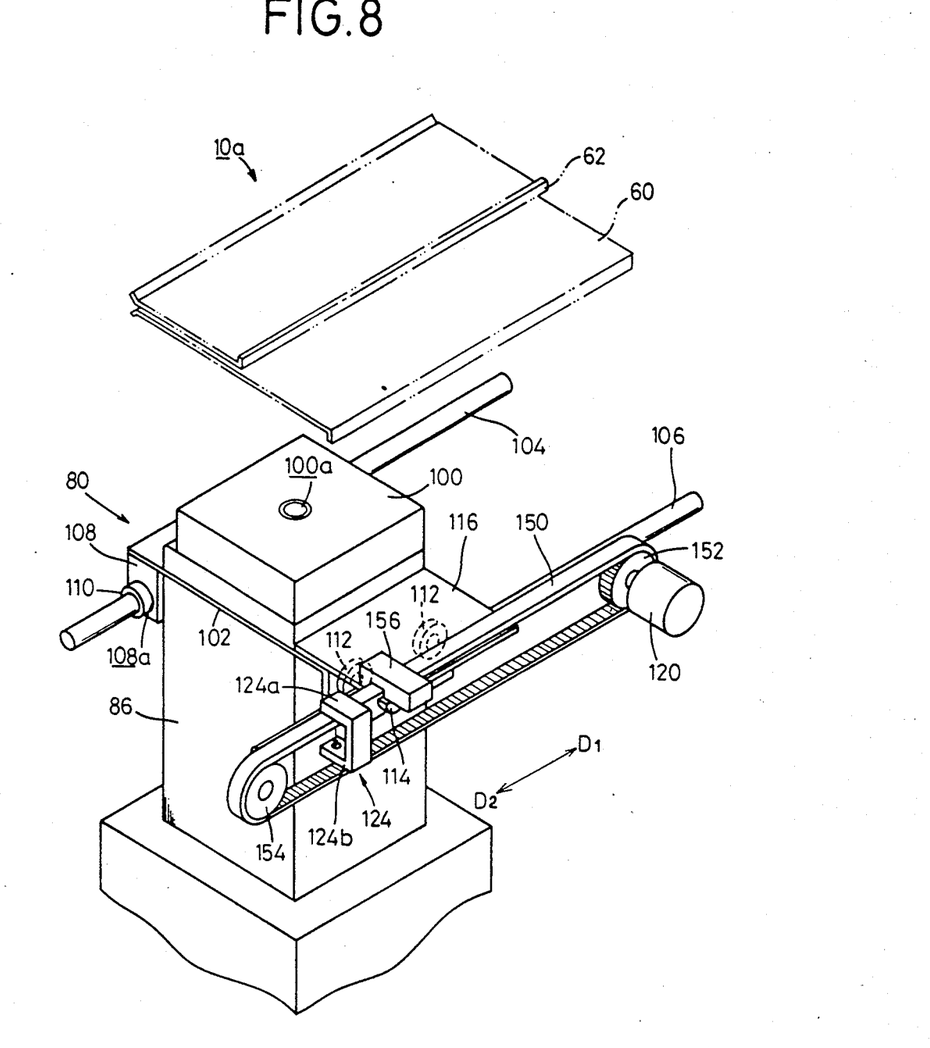
FIG. 8 is fragmentary perspective view of an image photographing apparatus according to another embodiment of the present invention.

As shown in FIG. 8, an image photographing apparatus 10a has a belt drive mechanism, rather than the rack-and-pinion mechanism, for moving the optical mechanism 80. Drive forces from the second stepping motor 120 are transmitted to the optical mechanism 80 through a transmission belt 150 to displace the optical mechanism 80 in the direction of the arrow $D_1$ or $D_2$. The drive shaft 120a of the second stepping motor 120 supports a pulley 152 thereon. The transmission belt 150 is trained around the pulley 152 and another pulley 154 which is spaced from the pulley 152 in the direction of the arrow $D_2$. The transmission belt 150 has an upper run which is fixed at its intermediate portion to the attachment 116 through a connector 156 to connect the transmission belt 150 to the optical mechanism 80. The connector 156 has an outer end which projects outwardly from the attachment 116, and the projecting outer end of the connector 156 can enter the photosensor 124. When the pulley 152 is rotated by the second stepping motor 120, the transmission belt 150 runs to displace the optical mechanism 80 in the direction of the arrow $D_1$ or $D_2$.

The optical mechanism 80 can be stopped selectively in different positions corresponding to different positions or frames on the film F. The optical mechanism 80 is stopped and positioned in the reference position when the attachment 116 enters the photosensor 124.

Therefore, like the image photographing apparatus 10 of the preceding embodiment, after images have been photographed on the first film F, the image photographing apparatus 10a ca photograph images highly accurately on subsequent films as the photographing cycle starting position remains the same with respect to all of the films F in the image positioning mechanism 60.

With the present invention, as described above, for successively photographing images on the photosensitive medium, the optical mechanism having the CRT monitor for displaying images is first positioned in the reference position and then moved to a first photographing position in which a desired image is photographed on the photosensitive medium. Thereafter, the optical mechanism is displaced to a next photographing position in which a next image is photographed on the photosensitive medium. After all desired images have been photographed on the photosensitive medium, the optical mechanism is once returned to the reference position. Then, the optical mechanism is successively displaced to photograph desired images on a next photosensitive medium in different photographing positions thereon, in the manner described above. Therefore, since the image photographing cycle starting positions remains unchanged at all times with respect to photosensitive mediums, the positions of photographed images are aligned. Consequently, the images can be photographed highly accurately.

Furthermore, when image information displayed by the CRT monitor is to be photographed on the photosensitive medium, the photosensitive medium is positioned by the constant feed roller pair which can feed the photosensitive medium a prescribed interval and stop the same in position, and the paired guide plates which are spaced from each other. The distance or gap between the guide plates is slightly larger than the thickness of the photosensitive medium and smaller than the depth of field of the focusing lens used. Thus, even if the photosensitive medium is curved, it is corrected out of the curved condition and kept flatwise to allow the image information to be formed accurately on the photosensitive medium by the optical mechanism. The optical mechanism is movable along one axis only, and the photosensitive medium can be fed by the constant feed roller pair in a direction substantially normal to the direction in which the optical mechanism is movable. With this arrangement, it is not necessary to provide any presser plate for positioning the photosensitive medium, and hence no drive mechanism for actuating such a presser plate is needed. As a result, desired images can be photographed on the photosensitive medium with high accuracy by a simple arrangement. Inasmuch as the optical mechanism is displaceable in one direction only, its construction is simple, and hence the image photographing apparatus itself is also simplified and the cost of manufacture thereof is lowered.

Moreover, the optical mechanism for forming a desired image on the photosensitive medium includes the monitor for displaying the image and the plural focusing lenses for focusing the displayed image on the photosensitive medium selectively at respective magnifications, the focusing lenses being selectively displaceable into an operative position. One of the focusing lenses, which is more frequently used than the other, is positionable in alignment with the optical axis of the monitor, and the other focusing lens, when in use, is slightly displaced off the optical axis of the monitor. The ranges on the photosensitive medium in which the images are focused by the respective focusing lenses have ends substantially aligned on the photosensitive medium, i.e., light that has passed through the focusing lenses to the photosensitive medium has edges in substantially the same position on the photosensitive medium. When photographing images at different magnifications on the photosensitive medium in the image photographing apparatus incorporating the optical mechanism, it is not necessary to position the photosensitive medium with respect to the focusing lenses and to use any sensor for such positioning. Consequently, images can easily be photographed at different magnifications without complicating the structure of the image photographing apparatus.

Although certain preferred embodiments have been shown and described, it should be understood that many changes and modifications may be made therein without departing from the scope of the appended claims.

What is claimed is:

1. An apparatus for photographing images displayed by a display unit on a photosensitive medium, comprising
    a first feed mechanism for feeding the photosensitive medium to a predetermined position;
    an image-focusing optical mechanism for photographing the images on the photosensitive medium fed by said first feed mechanism;
    an image positioning mechanism for positioning the photosensitive medium and delivering the photosensitive medium at predetermined intervals while the images are successively photographed on the photosensitive medium by said optical mechanism, said image positioning mechanism comprising a constant feed roller pair for feeding the photosensitive medium in a predetermined length and a pair of guide members, said feed roller pair being disposed in confronting relation to said first feed mechanism, one of said guide members facing said optical mechanism and having an opening defined therein for passage therethrough of light from the displayed images, said image positioning mechanism being arranged to deliver the photosensitive medium toward said first feed mechanism while holding one end of the photosensitive medium with said feed roller pair to allow said optical mechanism to photograph the images on the photosensitive medium in at least two frames thereon; and
    a second feed mechanism for feeding the photosensitive medium after the images have been photographed thereon.

2. An apparatus according to claim 1, wherein said first feed mechanism comprises a pair of rollers and a first guide member which is angularly movable to feed the photosensitive medium selectively to said image positioning mechanism and said second feed mechanism.

3. An apparatus according to claim 2, wherein said first feed mechanism further comprises a second guide member disposed above said first guide member and slanted for guiding a leading end of the photosensitive medium toward said constant feed roller pair.

4. An apparatus according to claim 1, wherein said image focusing mechanism includes a stepping motor directly coupled to said constant feed roller pair for rotating the same.

5. An apparatus according to claim 1, wherein said guide members of said image positioning mechanism are spaced from each other by a gap which is greater than the thickness of said photosensitive medium and smaller than the depth of field of a focusing lens of said optical mechanism.

6. An apparatus according to claim 5 wherein said optical mechanism includes the display unit and a focusing lens, and is displaceable in a direction substantially normal to the direction in which the photosensitive medium is delivered in said image positioning mechanism.

7. An apparatus according to claim 1 or 2, further including a single drive source for actuating said first and second feed mechanisms.

8. An apparatus according to claim 1, further including a support member supporting said first mechanism, said image positioning mechanism, and said second feed mechanism.

9. An apparatus according to claim 1, further including a housing in which said first feed mechanism, said optical mechanism, said image positioning mechanism, and said second feed mechanism are accommodated, and a cable extending out of said housing for supplying an image signal to said optical mechanism, said housing including light-shielding means disposed around said cable for preventing extraneous light from entering said housing.

* * * * *